United States Patent Office 2,928,831
Patented Mar. 15, 1960

2,928,831

AMINOALKYLAMINOMETHYLENEMALONO-NITRILES AND THEIR PREPARATION

Alexander R. Surrey, Albany, N.Y., assignor to Sterling Drug Inc., New York, N.Y., a corporation of Delaware No Drawing. Application July 2, 1957
Serial No. 669,458

23 Claims. (Cl. 260—247.5)

This invention relates to compositions of matter of the class of aminomethylenemalononitrile derivatives and to their preparation. In particular, the compounds of this invention are novel aminoalkylaminomethylenemalononitriles, and their acid-addition and quaternary ammonium salts.

The invention here resides in the concept of a composition of matter in which at least one lower-secondary- or lower-tertiary-amino-lower-alkyl radical is attached to the amino nitrogen atom of an aminomethylenemalononitrile. In the event only one such radical is present, the amino nitrogen atom of the nitrile bears either hydrogen or a lower-hydrocarbyl radical as the other substituent. The acid-addition and quaternary ammonium salts of such compositions are also included within the scope of the invention, as are processes for the preparation of all of the foregoing compositions.

My compounds in free base form have the general Formula I

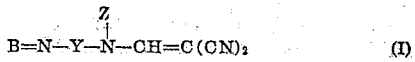

where B=N is selected from the group consisting of a lower-secondary-amino radical when Z is H or a lower-hydrocarbyl radical and a lower-tertiary-amino radical, Y is a lower-alkylene radical having its two connecting linkages on different carbon atoms, and Z is selected from the group consisting of H, a lower-hydrocarbyl radical and a (lower-tertiary-amino)-(lower-polycarbon-alkyl) radical.

In the above general Formula I, the lower-alkylene radical designated as Y has preferably from two to four carbon atoms, inclusive, including such examples as

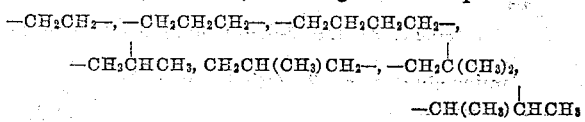

and the like.

The amino radical, shown above as B=N, comprehends lower-secondary-amino radicals when Z stands for H or a lower-hydrocarbyl radical, said lower-secondary-amino radicals preferably having from one to six carbon atoms illustrated by: monocycloalkylamino radicals where the cycloalkyl group has preferably three to six ring-carbon atoms such radicals including cyclopropyl-amino, cyclobutylamino, cyclopentylamino and cyclohexylamino; mono - (lower - hydroxyalkyl)amino radicals where the lower-hydroxyalkyl group has preferably two to six carbon atoms such radicals including 2-hydroxyethylamino, 3-hydroxypropylamino, 4-hydroxybutylamino, 2-hydroxypropylamino, 6-hydroxyhexylamino, and the like; and mono-(lower-alkyl)amino radicals where the lower-alkyl group has preferably one to six carbon atoms such radicals including methylamino, ethylamino, n-propylamino, isopropylamino, n-butylamino, 2-butylamino, isobutylamino, n-amylamino, n-hexylamino, and the like. The amino radical B=N also comprehends di- (lower-alkyl)amino radicals where the lower-alkyl groups are alike or different and each alkyl group has preferably from one to six carbon atoms, such dialkylamino radicals including dimethylamino, diethylamino, ethyl-methylamino, diisopropylamino, ethyl-n-propylamino, di-n-butylamino, di-n-hexylamino, and the like. Further, the amino radical designated as B=N encompasses saturated N-heteromonocyclic radicals having five to six ring atoms, illustrated by examples such as 1-piperidyl; (lower-alkylated)-1-piperidyl such as 2-methyl-1-piperidyl, 3-ethyl-1-piperidyl, 4-methyl-1-piperidyl, 2,6-dimethyl-1-piperidyl; 1-pyrrolidyl; (lower-alkylated)-1-pyrrolidyl such as 2-methyl-1-pyrrolidyl, 3-ethyl-1-pyrrolidyl, 2,5-dimethyl-1-pyrrolidyl; 4-morpholinyl; and the like.

When representing a (lower-tertiary-amino)-(lower-polycarbon-alkyl) radical, Z comprehends radicals of the same class defined above for B=N—Y where B=N designates a lower-tertiary-amino radical as illustrated above.

When representing a lower-hydrocarbyl radical, Z has preferably from one to eight carbon atoms and comprehends alkyl, alkenyl, cycloalkyl, cycloalkylalkyl, phenyl, alkylated-phenyl, benzyl or phenethyl, as illustrated by methyl, isopropyl, n-hexyl, 2-propenyl, cyclopropyl, cyclohexyl, cyclopropylethyl, cyclohexylmethyl, phenyl, 2,4-dimethylphenyl, benzyl, 2-phenylethyl, and the like.

My invention comprehends not only the above-described aminoalkylaminomethylenemalononitriles in their free base form, but also their acid-addition salts and, where B=N is lower-tertiary-amino, their quaternary ammonium salts.

The acids which can be used to prepare acid-addition salts are preferably those which produce, when combined with the free base, pharmacodynamically acceptable salts, that is, salts whose anions are relatively innocuous to an animal organism in pharmacodynamic doses of the salts, so that the beneficial physiological properties inherent in the free base are not vitiated by side effects ascribable to the anions; in other words, the latter do not substantially affect the pharmacodynamic properties inherent in the cations. In practicing my invention, I found it convenient to employ the hydrochloride salts. However, other appropriate pharmacodynamically acceptable salts are those derived from mineral acids such as hydrobromic acid, hydriodic acid, phosphoric acid, sulfuric acid and sulfamic acid; and organic acids such as ethanesulfonic acid, tartaric acid, citric acid, succinic acid, acetic acid, benzoic acid, quinic acid, oleic acid, and the like, yielding the following respective salts: hydrobromides, hydriodides, phosphates, sulfates, sulfamates, ethanesulfonates, tartrates, citrates, succinates, acetates, benzoates, quinates, oleates, and the like.

The acid-addition salts are prepared either by dissolving the free base in an aqueous solution containing the appropriate acid and isolating the salt by evaporating the solution, or by reacting the free base and acid in an organic solvent, in which case the salt separates directly or can be obtained by concentration of the solution.

Although pharmacodynamically acceptable salts are preferred, all acid-addition salts are within the scope of my invention. All acid-addition salts are useful as sources of the free base form even if the particular salt per se is not desired as the final product, as for example when the salt is formed only for purposes of purification or identification, or when it is used as an intermediate in preparing a pharmacodynamically acceptable salt by ion-exchange procedures.

The quaternary ammonium salts of my invention are prepared by reacting my tertiary-aminoalkylaminomethylenemalononitriles (I where B=N is tertiary-amino) with a lower-alkyl or aralkyl ester of a strong inorganic or organic acid, including such esters as methyl iodide, methyl bromide, ethyl chloride, ethyl bromide, ethyl sulfate, n-propyl iodide, hexyl bromide, benzyl bromide, 2-chlorobenzyl chloride, 4-nitrobenzyl chloride, 4-chlorobenzyl chloride, 4-methoxybenzyl chloride, methyl para-toluenesulfonate, ethyl para-toluenesulfonate, ethyl benzenesulfonate, and the like, the respective quaternary salts being the methiodides, methobromides, ethochlorides, ethobromides, ethosulfates, n-propiodides, benzobromides, 2-chlorobenzochlorides, 4-nitrobenzochlorides, 4-chlorobenzochlorides, 4-methoxybenzochlorides, metho-para-toluenesulfonates, etho-para-toluenesulfonates, etho-benzenesulfonates, and the like.

The quaternary ammonium salts are prepared preferably by mixing the free tertiary-amine and ester of a strong acid in an inert solvent such as acetonitrile. Heating may be used to facilitate the reaction, although salt formation usually takes place readily at room temperature. The quaternary ammonium salt separates directly or can be obtained by concentration of the solution or by treating the reaction solution with dry ether to initiate precipitation.

It is also possible to convert one quaternary ammonium salt to another in which the anion is different. If the anion of the original quaternary salt forms a water-insoluble silver salt, e.g., chloride, the quaternary salt will react with silver oxide in aqueous medium to form the corresponding quaternary ammonium hydroxide, the original anion being removed as a precipitate. The quaternary ammonium hydroxide solution can then be neutralized with any desired acid, weak or strong, to produce a new quaternary ammonium salt in which the anion is different from that of the original salt. In this way quaternary ammonium salts in which the anion is derived from a weak acid can be obtained, e.g., citrate, tartrate.

The invention also comprehends the preparation of my basic lower-secondary- and lower-tertiary-aminoalkylaminomethylenemalononitriles which comprises reacting a (lower-alkoxy)methylenemalononitrile, preferably ethoxymethylenemalononitrile, with a lower-secondary- or lower-tertiary-alkylenediamine of the formula, B=N—Y—NHZ, where B=N, Y and Z have the meanings given above. For example, 4-cyclohexylaminobutylaminomethylenemalononitrile is prepared by reacting 4-cyclohexylaminobutylamine with ethoxymethylenemalononitrile; similarly, 2-diethylaminoethylaminomethylenemalononitrile is prepared by reacting 2-diethylaminoethylamine with ethoxymethylenemalononitrile. The reaction is exothermic and was carried out preferably by slowly mixing the reactants at room temperature in a solvent such as ethanol or methanol. Alternatively, the solvent can be omitted. The basic nitriles were isolated preferably as their hydrochlorides by treating the reaction mixture with a solution of hydrogen chloride in ethanol (i.e., ethanolic-HCl) and collecting the precipitated hydrochloride. In some cases, a small amount of ether was added to initiate precipitation of the salt followed by chilling of the mixture. The product in free base form was obtained readily from the hydrochloride salt by dissolving it in water, making the solution basic with an alkaline agent such as ammonium hydroxide or sodium hydroxide and separating the basic product by filtration when a solid or by extraction and removal of the solvent when an oil.

In the preparation of my compounds where B=N is lower-secondary-amino and Z is H or lower-hydrocarbyl, that is, where the intermediate diamine of the formula B=N—Y—NHZ contains two available N-hydrogen atoms for condensation with the (lower-alkoxy)methylenemalononitrile, it is possible to get a mixture of products; however, both products that would result by the reaction of a molar equivalent of the alkoxymethylenemalononitrile with a molar equivalent of the diamine or a mixture of these two products are comprehended by this invention. Where B=N is lower-secondary-amino and where Z is H, I found the intermediate diamine of the formula B=N—Y—NH₂ to react preferentially at its primary amino grouping to yield predominantly one product, which was easily isolated from the reaction mixture.

The chemical structures of the compounds of my invention are established by their mode of synthesis and corroborated by the correspondence of calculated and found values for the elementary analyses for representative examples.

My aminoalkylaminomethylenemalononitriles in free base form are useful in the preparation of their acid-addition and quaternary ammonium salts. The salts when tested by standard procedures have been found to have pharmacodynamic properties, for instance, analgesic activity for the acid-addition salts and ganglionic blocking activity for the quaternary ammonium salts. The compounds can be prepared for use as analgesic or ganglionic blocking agents by means similar to those employed for conventional analgesic agents such as aminopyrine or ganglionic blocking agents such as hexamethonium salts.

The following examples will further illustrate the invention without, however, limiting it thereto.

EXAMPLE 1

2-diethylaminoethylaminomethylenemalononitrile

To a stirred solution of 7.0 g. of ethoxymethylenemalononitrile in 140 ml. of absolute ethanol was added dropwise 6.7 g. of 2-diethylaminoethylamine over a period of about twenty minutes. The solution was stirred for an additional hour and 17.5 ml. of 3.28 N ethanolic-HCl was added slowly. Absolute ether was added to faint turbidity and the solution cooled in an ice bath. The precipitate was collected, recrystallized from isopropanol and dried at 100° C. for twenty-four hours, yielding 10.8 g. (65%) of 2-diethylaminoethylaminomethylenemalononitrile hydrochloride, M.P. 149.1–150.1° C. (corr.).

Analysis.—Calcd. for $C_{10}H_{16}N_4 \cdot HCl$: $Cl^-$, 15.50; N, 24.49. Found: $Cl^-$, 15.40; N, 24.31.

2 - diethylaminoethylaminomethylenemalononitrile in free base form was obtained by dissolving a sample of the hydrochloride in water, making the solution basic with ammonium hydroxide, collecting the precipitate, washing it with water and recrystallizing it from benzene-n-hexane. 2-diethylaminoethylaminomethylenemalononitrile, thus obtained, melted at 102° C. after drying at 60° C. for twenty-four hours.

Analysis.—Calcd. for $C_{10}H_{16}N_4$: N, 29.11. Found: N, 28.7.

By replacement of the 2-diethylaminoethylamine in the preceding preparation by molar equivalents of 2-dimethylaminoethylamine, 2 - (ethyl - methyl)aminoethylamine or 2-di-n-hexylaminoethylamine, there can be obtained 2 - dimethylaminoethylaminomethylenemalononitrile, 2-(ethyl-methylamino)ethylaminomethylenemalononitrile or 2 - di - n - hexylaminoethylaminomethylenemalononitrile, respectively. These compounds can be isolated in the form of their free bases or as their acid-addition salts, preferably the hydrochlorides.

2-diethylaminoethylaminomethylenemalononitrile hydrochloride can also be prepared following the above procedure but using other (lower - alkoxy)methylenemalononitriles such as methoxymethylenemalononitrile, n-propoxymethylenemalononitrile or isobutoxymethylenemalononitrile in place of ethoxymethylenemalononitrile.

EXAMPLE 2

2-di-n-butylaminoethylaminomethylenemalononitrile

Following the procedure described in Example 1 using 6.1 g. of ethoxymethylenemalononitrile, 8.6 g. of 2-di-n-butylaminoethylamine and 120 ml. of absolute ethanol, there was obtained 10.7 g. of 2-di-n-butylaminoethyl-aminomethylenemalononitrile in the form of its hydrochloride, M.P. 114.2–115.2° C. (corr.).

Analysis.—Calcd. for $C_{14}H_{24}N_4 \cdot HCl$: Cl⁻, 12.45; N, 19.67. Found: Cl⁻, 12.47; N, 19.38.

2-di-n-butylaminoethylaminomethylenemalononitrile in free base form is obtained from the hydrochloride by the procedure described in Example 1.

Pharmacological evaluation of 2-di-n-butylaminoethyl-aminomethylenemalononitrile hydrochloride in aqueous solution administered subcutaneously by the Standard Radiant Thermal Stimulus Method in rats as described by N. Ercoli and M. N. Lewis [J. Pharmacol. & Exp. Therap. 84, 301 (1945)] has shown that this compound has a threshold dose of about 50 mg. per kg. or, in other words, it is about twice as active an analgesic as aminopyrine. The approximate acute intraperitoneal toxicity in mice ($ALD_{50}$) of this compound was found to be 130 mg. per kg.

EXAMPLE 3

*4-di-n-butylaminobutylaminomethylenemalononitrile*

12.2 g. of ethoxymethylenemalononitrile was added in portions with stirring to 20.3 g. of 4-di-n-butylamino-butylamine. After the addition had been completed, the reaction mixture was stirred for an additional thirty minutes, followed by addition of 75 ml. of isopropanol and 16.3 ml. of 6.18 N ethanolic-HCl. Ether was added whereupon an oil separated. The oil was isolated by decanting the supernatant liquid and was taken up in water. The aqueous solution was made basic with ammonium hydroxide and extracted with benzene. The benzene was removed by distilling in vacuo; the residual material was taken up in isopropanol; and ethanolic-HCl and ether were added successively to the solution. The solid that separated after the mixture had stood for about twenty-four hours was collected by filtration. To the filtrate was added more ether and the resulting solution was seeded with some of the filtered solid whereupon there separated more solid which was collected. The combined solids were recrystallized from isopropanol-ether to yield 13.2 g. of 4-di-n-butylaminobutyl-aminomethylenemalononitrile hydrochloride, M.P. 96.4–97.4° C. (corr.).

Analysis.—Calcd. for $C_{16}H_{28}N_4 \cdot HCl$: Cl⁻, 11.33; N, 17.91. Found: Cl⁻, 11,10; N, 17.72.

4 - di - n - butylaminobutylaminomethylenemalononitrile hydrochloride was found to have an approximate acute intraperitoneal toxicity in mice ($ALD_{50}$) of 200 mg. per kg.

4 - di - n - butylaminobutylaminomethylenemalononitrile in free base form is obtained from its hydrochloride salt following the procedure described in Example 1.

EXAMPLE 4

*3-diethylaminopropylaminomethylenemalononitrile*

Following the procedure described in Example 3 using 8 g. of ethoxymethylenemalononitrile and 8.6 g. of 3-diethylaminopropylamine, there was obtained 10.5 g. of 3-diethylaminopropylaminomethylenemalononitrile hydrochloride, M.P. 152.6–154.7° C. (corr.) when recrystallized from isopropanol and dried at 100° C. for about forty-eight hours.

Analysis.—Calcd. for $C_{11}H_{18}N_4 \cdot HCl$: Cl⁻, 14.61; N, 23.09. Found: Cl⁻, 14.58; N, 22.87.

3-diethylaminopropylaminomethylenemalononitrile hydrochloride was found to have an approximate acute intraperitoneal toxicity in mice ($ALD_{50}$) of 625 mg. per kg.

3-diethylaminopropylaminomethylenemalononitrile in free base form is obtained from its hydrochloride salt following the procedure described in Example 1.

EXAMPLE 5

*3-cyclopentylaminopropylaminomethylenemalononitrile*

To a stirred solution of 6.1 g. of ethoxymethylene-malononitrile in 60 ml. of methanol was added dropwise 7.6 g. of 3-cyclopentylaminopropylamine. The solution was stirred for an additional hour and an excess of ethanolic-HCl solution was added. When addition of ether failed to precipitate the product, the solvent was removed by distilling in vacuo, the residue taken up in a minimum quantity of isopropanol and the isopropanol solution placed under refrigeration for about seventy-two hours. The solid that separated was collected and recrystallized from isopropanol to yield 4.0 g. of 3-cyclopentylaminopropylaminomethylenemalono-nitrile hydrochloride, M.P. 139.6–142.5° C. (corr.).

Analysis.—Calcd. for $C_{12}H_{17}N_4 \cdot HCl$: Cl⁻, 13.97; N, 22.09. Found: Cl⁻, 13.96, 13.93; N, 21.62, 21.55, 21.71.

3-cyclopentylaminopropylaminomethylenemalononitrile in free base form is obtained from its hydrochloride following the procedure given in Example 1.

Pharmacological evaluation of 3-cyclopentylamino-propylaminomethylenemalononitrile hydrochloride in aqueous solution administered subcutaneously by the Standard Radiant Thermal Stimulus Method in rats as described by Ercoli and Lewis, ibid., has shown that this compound has a threshold dose of about 100 mg. per kg. or, in other words, it has approximately the same analgesic activity as aminopyrine. The approximate acute intravenous toxicity in mice ($ALD_{50}$) of this compound was found to be 270 mg. per kg.

By replacement of the 3-cyclopentylaminopropylamine in the preceding preparation by a molar equivalent amount of 2 - cyclohexylaminoethylamine or 4 - cyclopropylaminobutylamine, there can be obtained 2-cyclo-hexylaminoethylaminomethylenemalononitrile or 4-cyclo-propylaminobutylaminomethylenemalononitrile, respectively. These compounds can be isolated in free base form or as their acid-addition salts, preferably the hydrochlorides.

EXAMPLE 6

*2-(1-piperidyl)ethylaminomethylenemalononitrile*

This preparation was carried out following the procedure described in Example 5 using 12.2 g. of ethoxy-methylenemalononitrile, 12.8 g. of 2-(1-piperidyl)ethyl-amine and 75 ml. of methanol, except that in this preparation the product separated upon addition of the ethanolic-HCl to the reaction mixture. In fact, the solution turned almost completely solid whereupon isopropanol was added to facilitate stirring. After the mixture had been cooled, the product was collected, dried for twenty-four hours at 100° C. and recrystallized from methanol to yield 9.3 g. of 2-(1-piperidyl)ethylaminomethylenemal-ononitrile hydrochloride, M.P. 224.0–225.5° C. (corr.).

Analysis.—Calcd. for $C_{11}H_{16}N_4 \cdot HCl$: Cl⁻, 14.73; N, 23.28. Found: Cl⁻, 14.61; N, 23.03.

2 - (1 - piperidyl)ethylaminomethylenemalononitrile in free base form was obtained by dissolving 8.5 g. of its hydrochloride in a minimum volume of water, making the solution basic with ammonium hydroxide and cooling. The solid that separated was collected and recrystallized from benzene-n-hexane, yielding 5.0 g. of 2-(1-piperidyl)-ethylaminomethylenemalononitrile, M.P. 117.9–119.4° C. (corr.).

Analysis.—Calcd. for $C_{11}H_{16}N_4$: N, 27.43. Found: N, 27.24.

2-(1 - piperidyl)ethylaminomethylenemalononitrile hydrochloride was found to have an approximate acute intraperitoneal toxicity in mice ($ALD_{50}$) of 110 mg. per kg.

By replacement of 2-(1-piperidyl)ethylamine in the preceding preparation by a molar equivalent amount of 2-(2-methyl-1-piperidyl)ethylamine, 3-(1-pyrrolidyl)propylamine or 2-(2,5-dimethyl - 1 - pyrrolidyl)ethylamine, there can be obtained 2-(2-methyl-1-piperidyl)ethylaminomethylenemalononitrile; 3 - (1 - pyrrolidyl)propylaminomethylenemalononitrile or 2-(2,5-dimethyl-1-pyrrolidyl)-ethylaminomethylenemalononitrile, respectively. These compounds can be obtained in free base form or in the form of their acid-addition salts, preferably the hydrochlorides.

EXAMPLE 7

*2-(4-morpholinyl)ethylaminomethylenemalononitrile*

Following the procedure described in Example 1 using 6.1 g. of ethoxymethylenemalononitrile, 6.5 g. of 2-(4-morpholinyl)ethylamine and 120 ml. of ethanol, there was obtained 10.5 g. of 2-(4-morpholinyl)ethylaminomethylenemalononitrile hydrochloride, M.P. 216.6–218.6° C. (corr.) when recrystallized from methanol.

*Analysis.*—Calcd. for $C_{10}H_{14}N_4O \cdot HCl$: Cl⁻, 14.61; N, 23.09. Found: Cl⁻, 14.81; N, 22.77.

2-(4-morpholinyl)ethylaminomethylenemalononitrile in free base form was obtained from its hydrochloride following the procedure described in Example 1, M.P. 115–116° C. when recrystallized from benzene.

*Analysis.*—Calcd. for $C_{10}H_{14}N_4O$: N, 27.17. Found: N, 26.72.

2 - (4 - morpholinyl)ethylaminomethylenemalononitrile hydrochloride was found to have an approximate acute intraperitoneal toxicity in mice ($ALD_{50}$) of greater than 1000 mg. per kg.

EXAMPLE 8

*2-(2-hydroxyethylamino)ethylaminomethylenemalononitrile*

Following the procedure described in Example 5 using 6.1 g. of ethoxymethylenemalononitrile, 5.2 g. of 2-(2-hydroxyethylamino)ethylamine and 50 ml. of methanol, there was obtained the product, 2-(2-hydroxyethylamino)-ethylaminomethylenemalononitrile hydrochloride, M.P. 161–163° C. when recrystallized from methanol.

*Analysis.*—Calcd. for $C_8H_{12}N_4O \cdot HCl$: Cl⁻, 16.36. Found: Cl⁻, 16.32.

2-(2-hydroxyethylamino)ethylaminomethylenemalononitrile in free base form is obtained from its hydrochloride using the procedure given in Example 1.

By replacement of 2-(2-hydroxyethylamino)ethylamine in the preceding preparation by a molar equivalent amount of 2-(3-hydroxypropylamino)ethylamine, 4-(2-hydroxyethylamino)butylamine, 2-(6-hydroxyhexylamino)ethylamine, 2-ethylaminoethylamine, 2-n-hexylaminoethylamine or 4-methylaminobutylamine, there can be obtained 2-(3-hydroxypropylamino)ethylaminomethylenemalononitrile, 4-(2-hydroxyethylamino)butylaminomethylenemalononitrile, 2-(6-hydroxyhexylamino)ethylaminomethylenemalononitrile, 2-ethylaminoethylaminomethylenemalononitrile, 2 - n - hexylaminoethylaminomethylenemalononitrile or 4-methylaminobutylaminomethylenemalononitrile, respectively. These compounds can be isolated in free base form or as their acid-addition salts, preferably the hydrochlorides.

EXAMPLE 9

*2-diethylaminoethylaminomethylenemalononitrile methobromide*

To a solution containing 2.2 g. of 2-diethylaminoethylaminomethylenemalononitrile dissolved in benzene was added an excess of methyl bromide in dry benzene and the reaction mixture was allowed to stand seventy-two hours. The resulting solid was recrystallized from isopropanol to yield the product, 2-diethylaminoethylaminomethylenemalononitrile methobromide.

This compound was also prepared by adding 3.06 g. of methyl bromide to a solution containing 6.0 g. of 2-diethylaminoethylaminomethylenemalononitrile in 80 ml. of acetonitrile, allowing the reaction mixture to stand for twenty-four hours and seeding the reaction mixture with a sample of 2-diethylaminoethylaminomethylenemalononitrile methobromide obtained above. The solid that separated was collected; yield, 6 g. Another 1.5 g. was obtained by addition of 160 ml. of ether to the filtrate. The solids were combined and recrystallized from isopropanol to yield 7.4 g. of 2-diethylaminoethylaminomethylenemalononitrile methobromide, M.P. 177.0–178.7° C. (corr.).

*Analysis.*—Calcd. for $C_{11}H_{19}BrN_4$: Br⁻, 27.82; N, 19.52. Found: Br⁻, 27.90; N, 19.60.

2-diethylaminoethylaminomethylenemalononitrile methobromide was found to be approximately as effective as tetraethylammonium bromide in blockade of the sympathetic ganglia when measured by the carotid occlusion test in dogs essentially as described by Lape and Hoppe, J. Pharmacol. & Exp. Therap. 116, 453 (1956).

By replacement of the methyl bromide in the preceding preparation by molar equivalent amount of methyl iodide, ethyl chloride, ethyl sulfate, n-propyl iodide, hexyl bromide, benzyl bromide, 2-chlorobenzyl chloride, 4-nitrobenzyl chloride, 4-methoxybenzyl chloride or ethyl para-toluenesulfonate, there can be obtained, respectively, 2-diethylaminoethylaminomethylenemalononitrile methiodide, 2-diethylaminoethylaminomethylenemalononitrile ethochloride, 2-diethylaminoethylaminomethylenemalononitrile ethosulfate, 2-diethylaminoethylaminomethylenemalononitrile n-propiodide, 2-diethylaminoethylaminomethylenemalononitrile hexobromide, 2-diethylaminoethylaminomethylenemalononitrile benzochloride, 2-diethylaminoethylaminomethylenemalononitrile 2-chlorobenzochloride, 2-diethylaminoethylaminomethylenemalononitrile 4-nitrobenzochloride, 2-diethylaminoethylaminomethylenemalononitrile 4-methoxybenzochloride or 2-diethylaminoethylaminomethylenemalononitrile etho-para-toluenesulfonate.

EXAMPLE 10

*3-diethylaminopropylaminomethylenemalononitrile methobromide*

To a solution containing 8.7 g. of 3-diethylaminopropylaminomethylenemalononitrile in 70 ml. of acetonitrile was added 4.2 g. of methyl bromide. The reaction mixture was allowed to stand twenty-four hours and 140 ml. of ether was added. The resulting solid was collected, dried in vacuo for twenty-four hours, and recrystallized from isopropanol to yield 8.0 g. of 3-diethylaminopropylaminomethylenemalononitrile methobromide, M.P. 151.5–153.4° C. (corr.).

*Analysis.*—Calcd. for $C_{12}H_{21}BrN_4$: Br⁻, 26.54; N, 18.60. Found: Br⁻, 26.66; N, 18.58.

3 -- diethylaminopropylaminomethylenemalononitrile methobromide was found to be about 16% as effective as hexamethylene bis(trimethylammonium bromide) (hexamethonium bromide) in blockade of the sympathetic ganglia when measured by the nictitating membrane test in cats as described by Lape and Hoppe, J. Pharmacol. & Exp. Therap. 116, 453 (1956).

By replacement of the 3-diethylaminopropylaminomethylenemalononitrile in the preceding preparation by a molar equivalent amount of 2-dimethylaminoethylaminomethylenemalononitrile, 2 - (ethyl - methylamino)-ethylaminomethylenemalononitrile or 2-di-n-hexylaminoethylaminomethylenemalononitrile, there can be obtained, respectively, 2 - dimethylaminoethylaminomethylenemalononitrile methobromide, 2-(ethyl-methylamino)ethylaminomethylenemalononitrile methobromide or 2-di-n-hexylaminoethylaminomethylenemalononitrile methobromide.

EXAMPLE 11

*2-(1-piperidyl)ethylaminomethylenemalononitrile methobromide*

To a solution containing 4.5 g. of 2-(1-piperidyl)ethylaminomethylenemalononitrile in 50 ml. of acetonitrile was added 2.2 g. of methyl bromide. The reaction mixture was allowed to stand for twenty-four hours. The solid that separated was collected and recrystallized from absolute ethanol to give 5.3 g. of 2-(1-piperidyl)ethylaminomethylenemalononitrile methobromide, M.P. 210.6–211.8° C. (corr.).

*Analysis.*—Calcd. for $C_{12}H_{19}BrN_4$: Br⁻, 26.71; N, 18.73. Found: Br⁻, 26.97; N, 18.73.

By replacement of 2-(1-piperidyl)ethylaminomethylenemalononitrile in the preceding preparation by a molar equivalent amount of 2-(2-methyl-1-piperidyl)ethylaminomethylenemalononitrile, 3-(1-pyrrolidyl)propylaminomethylenemalononitrile, or 2-(2,5-dimethyl-1-pyrrolidyl)ethylaminomethylenemalononitrile, there can be obtained 2-(2-methyl-1-piperidyl)ethylaminomethylenemalononitrile methobromide, 3-(2-pyrrolidyl)propylaminomethylenemalononitrile methobromide, or 2-(2,5-dimethyl-1-pyrrolidyl)ethylaminomethylenemalononitrile methobromide, respectively.

EXAMPLE 12

*2-(4-morpholinyl)ethylaminomethylenemalononitrile methobromide*

Following the procedure described in Example 11, using 5.5 g. of 2-(4-morpholinyl)ethylaminomethylenemalononitrile, 55 ml. of acetonitrile and 2.6 g. of methyl bromide, there was obtained 2.5 g. of 2-(4-morpholinyl)-ethylaminomethylenemalononitrile methobromide, M.P. 198.6–200.4° C. (corr.), when recrystallized from methanol.

*Analysis.*—Calcd. for $C_{11}H_{17}BrN_4O$: Br⁻, 26.54; N, 18.60. Found: Br⁻, 26.70; N, 18.43.

EXAMPLE 13

*2-di-n-butylaminoethylaminomethylenemalononitrile methobromide*

Following the procedure described in Example 9, using 10 g. of 2-di-n-butylaminoethylaminomethylenemalononitrile, 100 ml. of acetonitrile and 3.94 g. of methyl bromide, there was obtained 7 g. of 2-di-n-butylaminoethylaminomethylenemalononitrile methobromide, M.P. 168.2–169.2° C. (corr.), when recrystallized from isopropanol.

*Analysis.*—Calcd. for $C_{15}H_{27}BrN_4$: Br⁻, 23.45; N, 16.32. Found: Br⁻, 23.36; N, 16.26.

EXAMPLE 14

*N-benzyl-N-(2-dimethylaminoethyl)aminomethylenemalononitrile hydrochloride*

A solution of 5.4 g. of ethoxymethylenemalononitrile in 30 ml. of methanol was added with stirring to a solution of 7.9 g. of N,N-dimethyl-N′-benzylethylenediamine in 20 ml. of methanol with evolution of heat. Stirring was continued until the reaction mixture reached room temperature and then the calculated amount of ethanolic-hydrogen chloride was added. After the addition of dry ether to incipient turbidity, followed by scratching, a solid product separated. After recrystallization from isopropyl alcohol, there was obtained 6 g. of product, N-benzyl-N-(2-dimethylaminoethyl)aminomethylenemalononitrile hydrochloride, M.P. 198.4–199.4° C. (corr.).

*Analysis.*—Calcd. for $C_{15}H_{18}N_4 \cdot HCl$: N, 19.24; Cl⁻, 12.19. Found: N, 19.17; Cl⁻, 12.12.

By replacement of N,N-dimethyl-N′-benzylethylenediamine in the preceding preparation by molar equivalents of N,N,N′-triethylethylenediamine, N,N-diethyl-N′-(allyl)ethylenediamine, N,N-diethyl-N′-(cyclohexyl)-ethylenediamine, N,N-dimethyl-N′-(cyclopentylmethyl)-ethylenediamine, 2-(1-piperidyl)-N-(phenyl)ethylenediamine, N,N-di-n-butyl-N′-(para-tolyl)propylenediamine or N,N-diethyl-N′-(phenethyl)ethylenediamine, there can be obtained N-(2-diethylaminoethyl)-N-ethylaminomethylenemalononitrile, N-allyl-N-(2-diethylaminoethyl)-aminoethylenemalononitrile, N-cyclohexyl-N-(2-diethylaminoethyl)aminomethylenemalononitrile, N-cyclopentylmethyl-N-(2-dimethylaminoethyl)aminomethylenemalononitrile, N-phenyl-N-[2-(1-piperidyl)ethyl]aminomethylenemalononitrile, N-para-tolyl-N-(3-di-n-butylaminopropyl)aminomethylenemalononitrile or N-phenethyl-N-(2-diethylaminoethyl)aminomethylenemalononitrile, respectively. These compounds can be isolated in the form of their free bases or as their acid-addition salts, preferably the hydrochlorides.

EXAMPLE 15

*Bis(2-diethylaminoethyl)aminomethylenemalononitrile dihydrochloride*

A solution of 9 g. of ethoxymethylenemalononitrile in 50 ml. of ethanol was added dropwise with stirring to a solution of 16 g. of bis(2-diethylaminoethyl)amine in 100 ml. of ethanol. After stirring for about one-half hour after the addition had been completed, the calculated amount of ethanolic-hydrogen chloride to form a dihydrochloride was added. Ether was then added to turbidity. The product which separated was collected (25 g.) and recrystallized from isopropyl alcohol to give 21 g. of product, bis(2-diethylaminoethyl)aminomethylenemalononitrile dihydrochloride, M.P. 167.4–168.8° C. (corr.).

*Analysis.*—Calcd. for $C_{16}H_{29}N_5 \cdot 2HCl$: N, 19.22; Cl⁻, 19.46. Found: N, 18.94; Cl⁻, 19.39.

Bis(2-diethylaminoethyl)aminomethylenemalononitrile in free base form is obtained from the dihydrochloride by the procedure described in Example 1.

Pharmacological evaluation of bis(2-diethylaminoethyl)-aminoethylenemalononitrile dihydrochloride in aqueous solution administered subcutaneously by the Standard Radiant Thermal Stimulus Method in rats (Ercoli and Lewis, ibid.) has shown that this compound has a threshold dose of about 100 mg. per kg. or, in other words, it is about as active an analgesic as aminopyrine.

By replacement of bis(2-diethylaminoethyl)amine in the above preparation by molar equivalents of bis(2-diisopropylaminoethyl)amine, bis[3-(1-pyrrolidyl)propyl]-amine or bis(4-dimethylaminobutyl)amine, there can be obtained bis (2-diisopropylaminoethyl)aminomethylenemalononitrile, bis[3-(1-pyrrolidyl)propyl]aminomethylenemalononitrile or bis(4-dimethylaminobutyl)aminomethylenemalononitrile, respectively. These compounds can be isolated in the form of their free bases or as their acid-addition salts, preferably the dihydrochlorides.

EXAMPLE 16

*Bis(2-diethylaminoethyl)aminomethylenemalononitrile dimethobromide*

A solution of 11 g. of bis(2-diethylaminoethyl)aminomethylenemalononitrile dihydrochloride in water was basified with ammonium hydroxide and the resulting bis(2-diethylaminoethyl)aminomethylenemalononitrile, which separated as an oil, was taken up in ether. After drying over magnesium sulfate, the ether was removed under partial vacuum. The residue, 9 g., was dissolved in 120 ml. of acetonitrile and 6 g. of methyl bromide gas added. After standing for three days, the solid which separated was collected and recrystallized from methyl alcohol to give 9 g. of product, bis(2-diethylaminoethyl)-aminomethylenemalononitrile dimethobromide, M.P. 252–252.2° C. (corr.) with decomposition.

*Analysis.*—Calcd. for $C_{18}H_{35}Br_2N_5$: N, 14.55; Br⁻, 33.22. Found: N, 14.22; Br⁻, 33.58.

Bis(2-diethylaminoethyl)aminomethylenemalononitrile dimethobromide was found to be approximately one-fourth as effective as tetraethylammonium bromide in blockade of the sympathetic ganglia when measured by the carotid occlusion test in dogs (Lape and Hoppe, ibid.). This dimethobromide salt was found to have an approximate acute intravenous toxicity in mice ($ALD_{50}$) of 36.0 mg. per kg.

By replacement of bis(2-diethylaminoethyl)aminomethylenemalononitrile dihydrochloride in the preceding preparation by molar equivalents of bis(2-diisopropylaminoethyl)aminomethylenemalononitrile, bis[3-(1-pyrrolidyl)propyl]aminomethylenemalononitrile or bis(4-dimethylaminobutyl)aminomethylenemalononitrile, there can be obtained bis(2-diisopropylaminoethyl)aminomethylenemalononitrile dimethobromide, bis[3 - pyrrolidyl)propyl]aminomethylenemalononitrile dimethobromide or bis(4 - dimethylaminobutyl)aminomethylenemalononitrile dimethobromide, respectively.

I claim:

1. A composition of matter selected from the group consisting of a compound having the formula

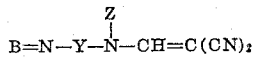

where Z is selected from the group consisting of H, hydrocarbon radicals of from one to eight carbon atoms, and B='N—Y'—, the expressions B=N and B'=N representing members of the group consisting of piperidyl, pyrrolidyl, morpholinyl, lower-alkyl-substituted derivatives thereof, and

where R and R' are members of the group consisting of monocycloalkyl having from three to six ring-carbon atoms, lower-hydroxyalkyl having from two to six carbon atoms and lower-alkyl having from one to six carbon atoms, B=N also being allowed the value

when Z is a member of the group consisting of H and hydrocarbon radicals of from one to eight carbon atoms, Y and Y' are lower-alkylene radicals having their two connecting linkages on different carbon atoms, and acid-addition and lower-alkyl- and aralkyl-quaternary ammonium salts thereof.

2. A compound having the formula $$B=N-Y-NHCH=C(CN)_2$$

where B=N is a lower-alkylamino radical having from one to six carbon atoms and Y is a lower-alkylene radical having its two connecting linkages on different carbon atoms.

3. An acid-addition salt of the compound of claim 2.

4. A compound having the formula $$B=N-Y-NHCH=C(CN)_2$$

where B=N is the morpholinyl radical and Y is a lower-alkylene radical having its two connecting linkages on different carbon atoms.

5. An acid-addition salt of the compound of claim 4.

6. A lower-alkyl-quaternary ammonium salt of the compound of claim 4.

7. A compound having the formula

where the cycloalkyl group has from three to six ring-carbon atoms and Y is a lower-alkylene radical having its two connecting linkages on different carbon atoms.

8. An acid-addition salt of the compound of claim 7.

9. A compound having the formula

where Y is a lower-alkylene radical having its two connecting linkages on different carbon atoms.

10. An acid-addition salt of the compound of claim 9.

11. A lower-alkyl-quaternary ammonium salt of the compound of claim 9.

12. A compound having the formula $$B=N-Y-NHCH=C(CN)_2$$

where B=N is the piperidyl radical and Y is a lower-alkylene radical having its two connecting linkages on different carbon atoms.

13. An acid-addition salt of the compound of claim 12.

14. A lower-alkyl-quaternary ammonium salt of the compound of claim 12.

15. A process for the preparation of a compound having the formula

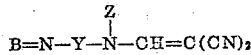

where Z is selected from the group consisting of H, hydrocarbon radicals of from one to eight carbon atoms, and B'=N—Y—', the expressions B=N and B'=N representing members of the group consisting of piperidyl, pyrrolidyl, morpholinyl, lower-alkyl-substituted derivatives thereof, and

where R and R' are members of the group consisting of monocycloalkyl having from three to six ring-carbon atoms, lower-hydroxyalkyl having from two to six carbon atoms, and lower-alkyl having from one to six carbon atoms, B=N also being allowed the value

when Z is a member of the group consisting of H and hydrocarbon radicals of from one to eight carbon atoms and Y and Y' are lower-alkylene radicals having their two connecting linkages on different carbon atoms which comprises reacting a (lower-alkoxy)methylenemalononitrile with an alkylenediamine of the formula $$B=N-Y-NHZ$$

wherein B=N, Y and Z have the meanings given above.

16. A process for the preparation of a compound having the formula $$B=N-Y-NHCH=C(CN)_2$$

where B=N is a lower-alkylamino radical having from one to six carbon atoms and Y is a lower-alkylene radical having its two connecting linkages on different carbon atoms, which comprises reacting a (lower-alkoxy)methylenemalononitrile with an alkylenediamine of the formula B=N—Y—NH$_2$, wherein B=N and Y have the meanings given above.

17. A process for the preparation of a compound having the formula $$B=N-Y-NHCH=C(CN)_2$$

where B=N is the morpholinyl radical and Y is a lower-alkylene radical having its two connecting linkages on different carbon atoms, which comprises reacting a (lower-alkoxy)methylenemalononitrile with an alkylenediamine of the formula B=N—Y—NH$_2$, wherein B=N and Y have the meanings given above.

18. A process for the preparation of a compound having the formula

where the cycloalkyl group has from three to six ring-carbon atoms and Y is a lower-alkylene radical having its two connecting linkages on different carbon atoms, which comprises reacting ethoxymethylenemalononitrile with a cycloalkylaminoalkylamine of the formula (cycloalkyl)—NH—Y—NH$_2$.

19. A process for the preparation of a compound having the formula (lower-alkyl)$_2$=N—Y—NHCH=C(CN)$_2$ where Y is a lower-alkylene radical having its two connecting linkages on different carbon atoms, which comprises reacting ethoxymethylenemalononitrile with a dialkylaminoalkylamine of the formula (lower-alkyl)$_2$=N—Y—NH$_2$ 20. A process for the preparation of a compound having the formula B=N—Y—NHCH=C(CH)$_2$ where B=N is the piperidyl radical and Y is a lower-alkylene radical having its two connecting linkages on different carbon atoms, which comprises reacting ethoxymethylenemalononitrile with a tertiary-aminoalkylamine of the formula B=N—Y—NH$_2$.

21. An aralkyl-quaternary ammonium salt of the compound of claim 4.

22. An aralkyl-quaternary ammonium salt of the compound of claim 9.

23. An aralkyl-quaternary ammonium salt of the compound of claim 12.

References Cited in the file of this patent
FOREIGN PATENTS 239,952    Switzerland _____ Mar. 16, 1946

UNITED STATES PATENT OFFICE
CERTIFICATE OF CORRECTION

Patent No. 2,928,831            March 15, 1960

Alexander R. Surrey

It is hereby certified that error appears in the printed specification of the above numbered patent requiring correction and that the said Letters Patent should read as corrected below.

Column 10, line 32, for "aminoethylenemalonitrile" read — aminomethylenemalononitrile —; column 11, line 7, for "bis[3-pyrrolidyl)" read — bis[3-(1-pyrrolidyl) —; line 19, for "and B='N-Y'-" read — and B'=N-Y'- —; column 12, line 18, for "B'=N-Y-'" read — B'=N-Y'- —; column 13, line 12, for that portion of the formula reading "C(CH)$_2$" read — C(CN)$_2$ —.

Signed and sealed this 23rd day of August 1960.

(SEAL)
Attest:

KARL H. AXLINE
Attesting Officer

ROBERT C. WATSON
Commissioner of Patents